(12) United States Patent
Bartolome et al.

(10) Patent No.: US 11,707,680 B2
(45) Date of Patent: Jul. 25, 2023

(54) HEALTH AND WELLNESS GAMIFICATION

(71) Applicant: SONY INTERACTIVE ENTERTAINMENT LLC, San Mateo, CA (US)

(72) Inventors: Angela Bartolome, San Mateo, CA (US); Brielle Powell, San Mateo, CA (US); Lee Gould, San Mateo, CA (US); Mahdi Azmandian, San Mateo, CA (US); Sarah Karp, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/411,655

(22) Filed: Aug. 25, 2021

(65) Prior Publication Data

US 2023/0021350 A1     Jan. 26, 2023

Related U.S. Application Data

(60) Provisional application No. 63/223,825, filed on Jul. 20, 2021.

(51) Int. Cl.
*A63F 13/00* (2014.01)
*A63F 13/65* (2014.01)
(Continued)

(52) U.S. Cl.
CPC ............ *A63F 13/65* (2014.09); *A63F 13/212* (2014.09); *A63F 13/56* (2014.09); *A63F 13/69* (2014.09);
(Continued)

(58) Field of Classification Search
CPC .. G06F 3/17; A63F 13/65; A63F 13/79; A63F 13/69
See application file for complete search history.

(56) References Cited

U.S. PATENT DOCUMENTS 8,313,377 B2    11/2012   Zalewski
8,332,544 B1    12/2012   Ralls et al.
(Continued)

FOREIGN PATENT DOCUMENTS

CN    113031269    6/2021
CN    115634446    1/2023
(Continued)

OTHER PUBLICATIONS

European Application No. 22183356.9 Extended European Search Report dated Nov. 29, 2022.
(Continued)

*Primary Examiner* — David L Lewis
*Assistant Examiner* — Eric M Thomas
(74) *Attorney, Agent, or Firm* — Polsinelli LLP (57) ABSTRACT

Systems and methods for integrating biometric data into gameplay of interactive content titles are provided. More specifically, such systems and methods may provide a healthcare gamification hub in an online gaming system. whereby players are incentivized to reach health and wellness goals that may be translated into in-game or metagaming resources for interactive content titles. Earning game resources may be associated stored health gamification rules that specify actions associated with corresponding biometric data and a virtual reward that is redeemable towards one or more in-game rewards associated with one or more interactive content titles. Real-time biometric data regarding a user may be received and the biometric data may be captured by one or more sensor devices.

20 Claims, 5 Drawing Sheets

(51) Int. Cl.
  *A63F 13/212* (2014.01)
  *A63F 13/56* (2014.01)
  *A63F 13/69* (2014.01)
(52) U.S. Cl.
  CPC ... *A63F 2300/1012* (2013.01); *A63F 2300/69* (2013.01)

(56) References Cited

U.S. PATENT DOCUMENTS

| | | | |
|---|---|---|---|
| 11,596,865 | B1 | 3/2023 | Sheldon et al. |
| 2004/0127272 | A1 | 7/2004 | Park et al. |
| 2009/0098979 | A1 | 4/2009 | Coshott |
| 2010/0004097 | A1 | 1/2010 | D'Eredita |
| 2010/0292006 | A1 | 11/2010 | Terrell et al. |
| 2011/0009241 | A1 | 1/2011 | Lane |
| 2011/0034300 | A1 | 2/2011 | Hall |
| 2011/0086707 | A1 | 4/2011 | Loveland |
| 2011/0173204 | A1 | 7/2011 | Murillo et al. |
| 2013/0032634 | A1* | 2/2013 | McKirdy ............. A61B 5/0205 235/375 |
| 2013/0059660 | A1 | 3/2013 | Zalewski |
| 2014/0243154 | A1 | 8/2014 | Park |
| 2014/0274564 | A1 | 9/2014 | Greenbaum |
| 2016/0030834 | A1* | 2/2016 | Brown ............... G06Q 30/0631 463/36 |
| 2016/0077547 | A1 | 3/2016 | Aimone |
| 2016/0082353 | A1 | 3/2016 | Christovale |
| 2016/0184634 | A1 | 6/2016 | Yanev et al. |
| 2016/0279514 | A1 | 9/2016 | Fung |
| 2017/0277254 | A1 | 9/2017 | Osman |
| 2017/0282078 | A1 | 10/2017 | Dugan |
| 2017/0365101 | A1 | 12/2017 | Samec |
| 2019/0060708 | A1 | 2/2019 | Fung |
| 2019/0126099 | A1 | 5/2019 | Hoang |
| 2019/0163270 | A1 | 5/2019 | Da Silva et al. |
| 2019/0371114 | A1 | 12/2019 | Diefenbach et al. |
| 2020/0164247 | A1 | 5/2020 | Kline et al. |
| 2020/0188774 | A1 | 6/2020 | Fung |
| 2021/0001171 | A1 | 1/2021 | Fung |
| 2021/0202067 | A1 | 7/2021 | Williams et al. |
| 2022/0040535 | A1 | 2/2022 | Warren |
| 2022/0143464 | A1 | 5/2022 | Nishimoto et al. |
| 2023/0024653 | A1 | 1/2023 | Gould |

FOREIGN PATENT DOCUMENTS

| | | |
|---|---|---|
| CN | 115705337 | 2/2023 |
| CN | 115712343 | 2/2023 |
| EP | 4 122 564 | 1/2023 |
| EP | 4 122 565 | 1/2023 |
| EP | 4 140 550 | 3/2023 |
| JP | 2023-016005 | 2/2023 |
| JP | 2023-016006 | 2/2023 |
| JP | 2023-027007 | 3/2023 |
| TW | 202313164 | 4/2023 |
| WO | WO 2016/126522 | 8/2016 |
| WO | WO 2017/194770 | 11/2017 |

OTHER PUBLICATIONS

European Application No. 22183350.2 Extended European Search Report dated Nov. 23, 2022.
U.S. Appl. No. 17/407,393, Lee Gould, Exercise or Sports Equipment as Game Controller, filed Aug. 20, 2021.
U.S. Appl. No. 17/403,260, Jennifer Sheldon, Dynamic Game Intervention, filed Aug. 16, 2021.
Taiwan Application No. 111123358 Office Action and Search Report dated Feb. 24, 2023.
European Application No. 22185682.6 Extended European Search Report dated Feb. 9, 2023.
U.S. Appl. No. 17/407,393 Office Action dated Feb. 14, 2023.

* cited by examiner

HEALTH AND WELLNESS GAMIFICATION

CROSS-REFERENCE TO RELATED APPLICATION

The present patent application claims the priority benefit of U.S. provisional patent application 63/223,825 filed on Jul. 20, 2021, the disclosure of which is incorporated by reference herein.

BACKGROUND OF THE INVENTION

1. Field of the Invention

The present technology pertains to providing accompanying gamification of health and wellness to interactive content titles. More specifically, the present technology may utilize biometric data to adjust interactive activities and rewards in interactive content titles.

2. Description of the Related Art

A variety of traditional digital games are played in sedentary positions. While fine motor skills may be used during gameplay, such traditional digital games generally do not involve any cardiovascular activity or other forms of physical exercise. Some digital game titles have started incorporating physical movements into game requirements. Digital game titles involving dancing, for example, may require the player to perform dance movements, thereby inherently involving physical exercise and exertion resulting from the dance movements. Other digital game—particularly those involving virtual reality—may incorporate full body movements into a game. While incorporating some physical activity, however, such games are generally not geared towards promoting health and wellness and otherwise do not consider health or wellness metrics in evaluating gameplay. Thus, while players may engage in some level of physical activity, such activity is not evaluated or assessed in accordance with health and wellness goals (e.g., as measured and defined by biometrics).

Health and wellness considerations may not only serve as a benefit for individual players, but also has the potential to change the landscape of gaming and how gaming can further be used to integrate healthier practices and activities into daily life. If presented in a compelling format, digital gaming and accompanying gamification components may serve as a motivating factor in improving health and wellness of players.

There is therefore a need in the art for improved systems and methods for providing a gamification hub that integrates and uses biometric data to adjust and reward gameplay in online gaming systems.

SUMMARY OF THE INVENTION

Disclosed are systems, apparatuses, methods, computer readable medium, and circuits for integrating biometric data into gameplay of interactive content titles. Such biometric data may be integrated by way of a healthcare gamification hub provided in an online gaming system. According to at least one example, a method includes: storing health gamification rules in memory, wherein the health gamification rules specify actions associated with corresponding biometric data and a virtual reward, the virtual reward redeemable towards one or more in-game rewards associated with one or more interactive content titles; receiving real-time biometric data regarding a user, the real-time biometric data captured by one or more sensor devices; identifying an action associated with the corresponding biometric data matching the real-time biometric data received in real-time; updating a user profile of the user to include the virtual reward associated with the identified action; and providing an in-game reward in response to a redemption request from a user device of the user, wherein providing the in-game reward is based on the virtual reward included in the user profile, and the in-game reward is available to the user during gameplay of an associated game title.

For example, the system stores the health gamification rules in memory, wherein the health gamification rules specify actions associated with corresponding biometric data and a virtual reward, the virtual reward redeemable towards one or more in-game rewards associated with one or more interactive content titles; receives real-time biometric data regarding a user, the real-time biometric data captured by one or more sensor devices; identifies an action associated with the corresponding biometric data matching the real-time biometric data received in real-time; updates a user profile of the user to include the virtual reward associated with the identified action; and provides an in-game reward in response to a redemption request from a user device of the user, wherein providing the in-game reward is based on the virtual reward included in the user profile, and the in-game reward is available to the user during gameplay of an associated game title.

In another example, a system for providing a healthcare gamification hub in an online gaming system is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to: store health gamification rules in memory, wherein the health gamification rules specify actions associated with corresponding biometric data and a virtual reward, the virtual reward redeemable towards one or more in-game rewards associated with one or more interactive content titles; receive real-time biometric data regarding a user, the real-time biometric data captured by one or more sensor devices; identify an action associated with the corresponding biometric data matching the real-time biometric data received in real-time; update a user profile of the user to include the virtual reward associated with the identified action; and provide an in-game reward in response to a redemption request from a user device of the user, wherein providing the in-game reward is based on the virtual reward included in the user profile, and the in-game reward is available to the user during gameplay of an associated game title.

DETAILED DESCRIPTION

Aspects of the present disclosure include systems and methods for integrate biometric data into gameplay of interactive content titles by providing a health and wellness gamification hub that incentivizes players to reach health and wellness goals. Such achievements may be translated into in-game or metagaming resources for different interactive content titles. Earning such resources may be associated with stored health gamification rules that specify actions associated with corresponding biometric data and a virtual reward that is redeemable towards one or more in-game rewards associated with one or more interactive content titles. Real-time biometric data regarding a user may be received and the biometric data may be captured by one or more sensor devices. An action associated with corresponding biometric data matching the real-time biometric data may be identified. A user profile of the user may be updated to include the virtual reward associated with the identified action, and an in-game reward in response to a redemption request from a user device of the user may be provided based on the virtual reward included in the user profile, and the in-game reward is available to the user during gameplay of an associated interactive content title.

Figure 1:
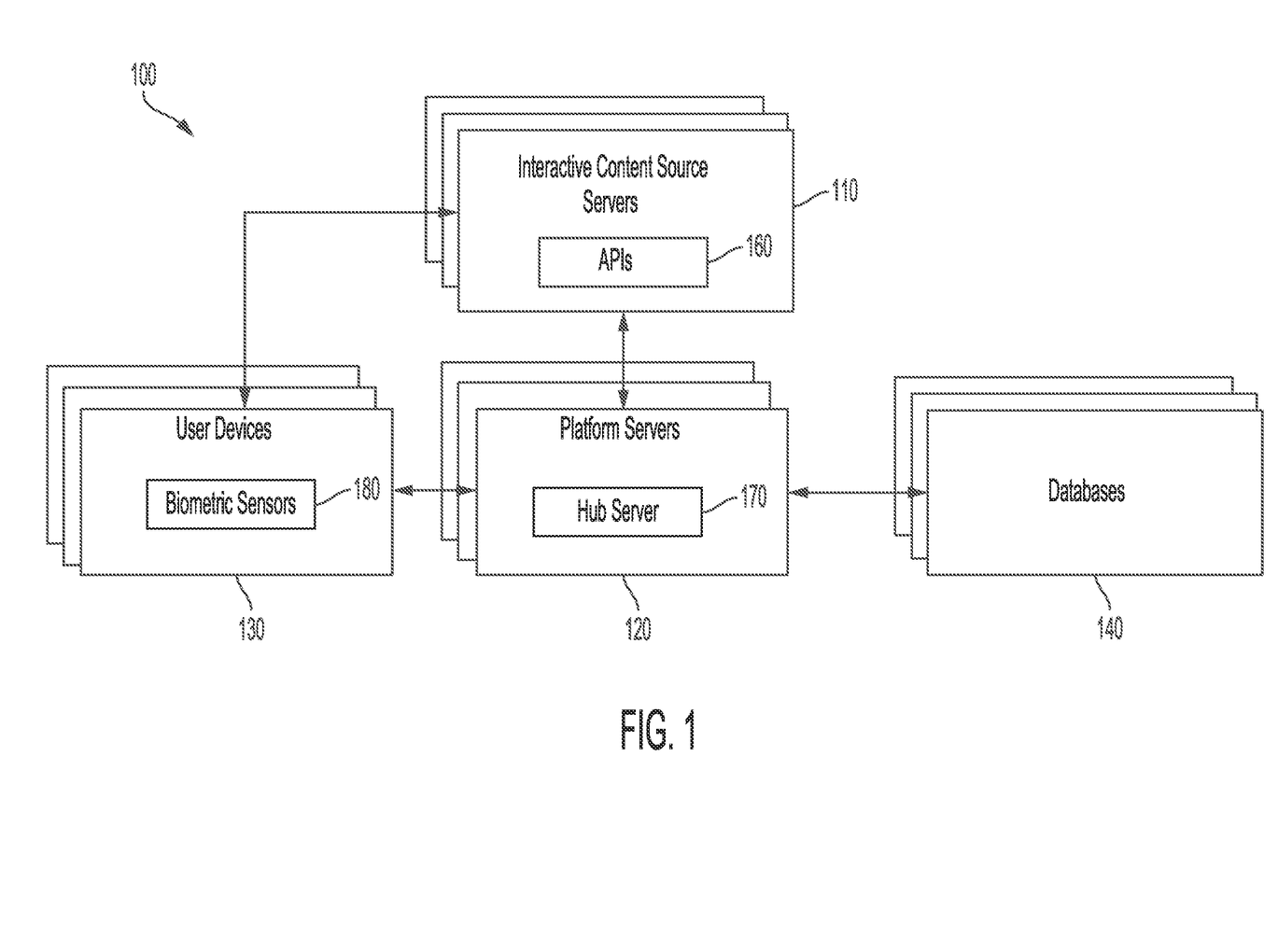
FIG. 1 illustrates an exemplary network environment in which system for integrating biometric data into gameplay of interactive content titles.

FIG. 1 illustrates an exemplary network environment 100 in which system for integrating biometric data into gameplay of interactive content titles. The network environment 100 may include one or more interactive content source servers 110 that provide interactive media content, one or more platform servers 120, one or more user devices 130, and one or more databases 140. The various devices illustrated in FIG. 1 may further communicate via one or more communication networks, such as local area networks or wide area networks (including the Internet).

Interactive content source servers 110 may maintain, stream, and host interactive media available to stream on a user device 130 over a communication network. Such interactive content source servers 110 may be implemented in the cloud (e.g., one or more cloud servers). The platform servers 120 may be responsible for communicating with the different interactive content source servers 110, databases 140, and user devices 130. Such platform servers 120 may be implemented on one or more cloud servers.

The platform servers 120 may also carry out instructions, for example, receiving a user request from a user to stream streaming media (i.e., games, activities, video, podcasts, User Generated Content ("UGC"), publisher content, music/video services (e.g., Spotify, Apple Music) etc. The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The platform servers 120 may include or otherwise be associated with a hub server 170 that may carry out instructions for controlling and maintaining a wellness gamification hub that integrates biometric data into gameplay of one or more interactive content titles. The wellness gamification hub application executed by hub server 170 may receive biometric data from biometric sensors 180 of the user devices 130. The hub server 170 may carry out instructions to store health gamification rules in memory, receive real-time biometric data regarding a user, which may be captured by one or more biometric sensors 180 of one or more user devices 130 and/or sensor devices 180. The hub server 170 may further identify an action associated with corresponding biometric data matching the real-time biometric data received in real-time. The hub server 170 may further update a user profile of the user to include a virtual reward, which an in-game reward may be based on and associated with a particular game title The streaming media and the associated at least one set of object data may be provided through an application programming interface (API) 160, which allows various types of interactive content source servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160. In some embodiments, a set of APIs may be provided as a software development kit (SDK) that allows a variety of different types of health and exercise equipment and services to be integrated with or otherwise capable of communicating data to hub server 170. Conversely, such an SDK may further allow hub server 170 to communicate instructions for adjusting one or more parameters of an activity in coordination with play of the media content title. For example, the hub server 170 may send instructions to an exercise bicycle to increase resistance to reflect uphill movement concurrent with an avatar climbing a hill in a virtual environment.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 5.

The user device 130 may include or otherwise associated with one or more sensor devices including biometric sensors 180, a computing device including the biometric sensors 180, or a controller including biometric sensors 180. For example, the biometric sensors 180 included on or associated with a controller may be capable of measuring electrodermal activity, or galvanic skin response and also record heart rate using the biometric sensors 180. The biometric sensors 180 may measure and record any variety of biometric data known in the art. In some embodiments, the user device 130 may further include a variety of other sensors known in the art, including motion sensors, accelerometers, global positioning systems (GPS), cameras, microphones, etc., to capture data regarding movement by the user. Such sensors may not only detect, but also measure different movements by the user. Such movement data and measurements may further be combined with biometric data to evaluate and assess user movement during gameplay, as well as used to define achievements or goals.

In some embodiments, user device 130 and biometric sensors 180 may further include or be associated with a variety of peripheral devices that may be associated with gameplay or physical exercise. For example, some peripheral devices may include wearable sensors or sensors associated with items held, handled, or otherwise engaged by the user in the course of gameplay (and associated movements).

The databases 140 may be stored on the interactive content source servers 110, platform server 120, hub server 170, or any other associated server, on the same server, on different servers, on a single server, across different servers, or on any of the user devices 130. In exemplary embodiments, such databases 140 may store the streaming media and/or an associated set of activity data objects. Such streaming media may depict one or more activities (e.g., in-game actions) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an specified activity object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2:
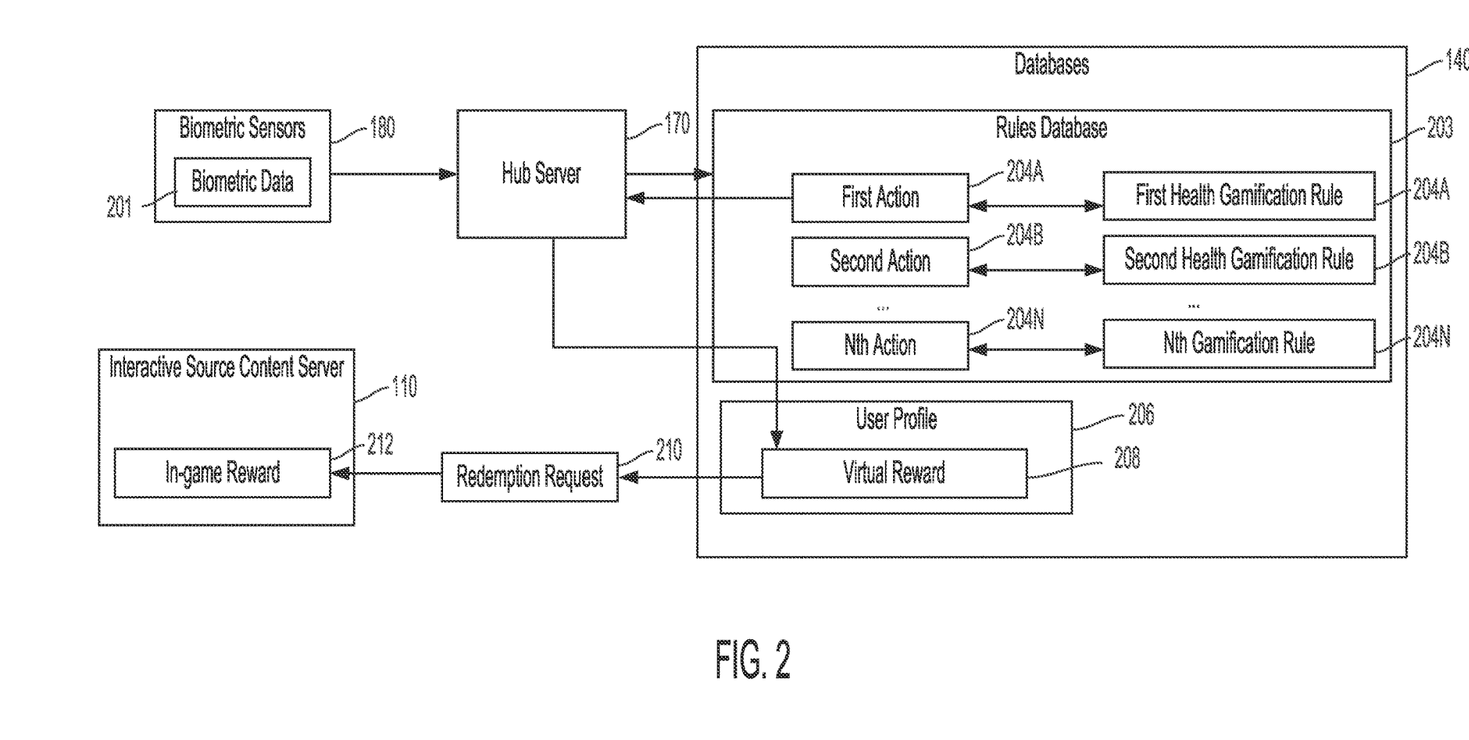
FIG. 2 is a diagram of an exemplary data flow of virtual reward redemption associated with integrating biometric data into gameplay of interactive content titles.

FIG. 2 is a diagram of an exemplary data flow of virtual reward redemption associated with integrating biometric data into gameplay of interactive content titles. In an exemplary implementation, real-time biometric data 201 may be captured at the biometric sensors 180. The biometric sensors 180, which may capture real-time biometric data 201, may be calibrated based on the kind of sensor use and used to compare to health gamification rules 202A, 202B, ... 202N (collectively 202), based on a user's height, weight, age, resting heart rate, etc.), or verified at the hub server 170. The biometric data 201 may include a heart rate, step cadence, movement patterns, breath patterns, O2 measurements, body temperature, speed, distance traveled, total workout time, calories burned, sweat analysis, etc.

The biometric data 201 captured by the biometric sensors 180 may be provided to hub server 170 for evaluation against the health gamification rules 202 stored in a rules database 203 in one or more of the databases 140. The captured real-time biometric data may be received in real-time during gameplay or outside of gameplay.

In some embodiments, the health gamification rules 202 may define one or more health/exercise modes of gameplay of different interactive content titles. For example, rather than earning points or achievements based on standard or other modes of gameplay, points and achievements may be defined based on level, type, and other characteristics of exercise movement or other health-related activity. Thus, pre-existing and future games may be played in a mode that assigns rewards at least partially based on metrics regarding physical exercise and other healthful activities. The health gamification rules may therefore be specific to certain content titles, certain genres, certain in-game activities, etc., and may include a map that correlates sensor data/biometrics to in-game achievements (e.g., points, bonuses).

Further embodiments may allow the health gamification rules 202 to adjust in-game conditions to promote physical activities or certain types thereof. As an example, gameplay aspects may be modified to require certain dynamic exercise regimen, in addition to or in replacement of inputs for game data from the one or more controller devices. For example, instead of using a jump control, the gameplay may require biometric data from one of the sensor devices that records that the user jumped. As another example, the one or more controller devices may include exercise equipment that may receive gameplay data from APIs and the gameplay aspects may be mirrored in experience at the exercise equipment as a form of tactical feedback. The difficulty level set at the exercise equipment may mirror what an avatar is experiencing. For example, if the avatar is running up a hill, the exercise equipment may increase in difficulty.

Further, the health/exercise modes of gameplay may be specific to and focus on certain types of movements (e.g., leg movements, arm movements, full body exercise, cardiovascular exercise, stretching exercise, strength exercise, etc.). Based on a specific mode selection, therefore, certain conditions within the virtual environment may be changed to promote the associated movement type. Such conditions may include characteristics of the player character, of the virtual environment, and of virtual objects. For example, a mode focused on leg exercise may modify a character or avatar of the player to have short(er) legs so as to require more leg movement in order to navigate the virtual environment. Further, the terrain of the virtual environment or virtual objects (and rules 202 related to the same) may require jumping or stretching to navigate and reach. Thus, different numbers and types of repetitions by different body parts at different speeds may be required to earn the same or different amount of points or rewards based on the selected mode. A player may therefore alternate different selected modes of gameplay on different days, so as to focus on cardio mode one day, arm and leg exercise the next day, and so on.

In addition to exercise movement, the health gamification rules 202 may further award or assign points or other rewards based on other types of health-related activities. For example, the user may be awarded points for taking a walk outdoors (as detected and confirmed by a GPS- and other sensor-enabled mobile device). Thus, the hub server 170 may also collect data from a variety of sources of data regarding the user, including user personal devices, applications, and accounts. In some instances, the user may be able to self-report completion of the task or activity where such task or activity may not be readily detectable or communicated by the user-associated sensors, devices, applications, or accounts. The health gamification rules 202 may map such completed task or activity to in-game achievements or rewards.

Further, the hub server 170 may also identify an action based on a stored health gamification rule 202 that specifies an action associated with corresponding biometric data, that matches the captured real-time biometric data 201, and a virtual reward. The hub server 170 may further cause to update a user profile 206 to include a virtual reward 208 associated with the identified action. For example, a first health gamification rule 202A, of health gamification rules 202, may indicate that if the heart rate associated with the user profile 205 is elevated past 100 bpm for 15 minutes, then a first action 204A is to reward 10 XPs as the virtual reward 208 to the user profile 206. Alternatively, from a wellness perspective, a second health gamification rule 202B may indicate that if the heart rate associated with the user profile 205 is kept below 75 bpm for 12 hours, then a second action 204B is to reward an extra life as the virtual reward 208 to the user profile 206. This may incentive players with anxiety and an elevated heartrate to perform meditation and breathing exercises throughout the day to obtain the extra life.

The user may request to redeem, in a redemption request 210, the virtual reward 208 for a particular game title. In response to the redemption request 210, an in-game reward 212, or a metagaming resource, may be provided to a game profile associated with the user profile 206 at an interactive source content server 110. For example, following the previous example, the 10 XPs may be converted into 10 extra health points in a boss battle for a particular game title.

Figure 3:
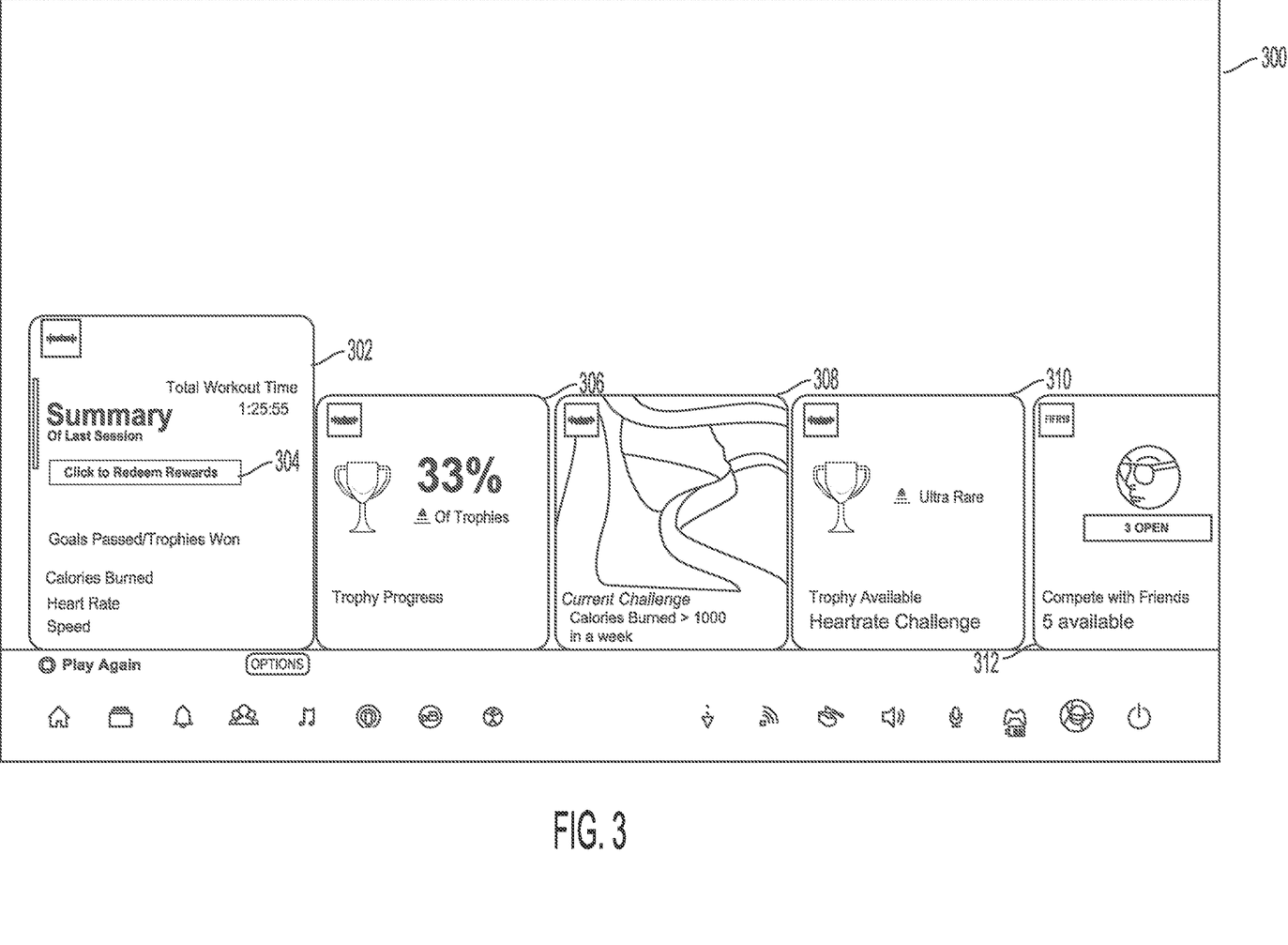
FIG. 3 is a screenshot of exemplary graphical user interfaces that may be presented on a user device used in integrating biometric data into gameplay of interactive content titles.

FIG. 3 is a screenshot of exemplary graphical user interfaces that may be presented on a user device used in integrating biometric data into gameplay of interactive content titles. The health and wellness hub screen 300 may include a summary 302 of a last session, which may include what trophies or health gamification rules 202 apply. For example, as shown in FIG. 3, the summary 302 of the last session indicates that three goals have been passed or trophies have been won, namely "Calories Burned", "Heart Rate", and "Speed." Therefore, there is a health gamification rule 202 associated with each of these goals/trophies and also an Nth associated action 204N. The Nth associated action 204N may cause the hub server 170 to provide and/or add to an associated virtual reward 208 for the user profile 206. The redemption request 210 may be received once the user selects "Click to Redeem Rewards" and selecting an in-game reward 212, if provided the option to choose.

The hub server 170 may further cause to display, at a user device 130, the health and wellness hub screen 300 including a progress of completion of all the different health gamification rules 202, such as in the form of progress of receiving trophies 306. The health and wellness hub screen 300 may include a current challenge 308 that is in progress, such as one that is ideally completed over the course of several days, or maybe even weeks. For example, if the biometric data 201 indicate that active calories burned is over 1000 calories in the course of a week, than the Nth associated action 204N may be a larger reward due to the more difficult nature of the challenge.

The hub server 170 may further cause to display one or more game options 310 at the health and wellness hub 300, wherein each game option may initiate a game with biometric data as an input for gameplay. For example, initiating "Heartrate Challenge" may be one in which the user's heart rate is used as an input in the gameplay. The heart rate may be monitored such that by playing game title requires movement and reaching a certain heart rate is the goal. In addition, the heart rate may be monitored such that increased heart rate may allow the avatar to move quicker. More specifically, during gameplay of the game, each of the one or more sensor devices include one or more biometric sensors or receives sensory data that is convertible into biometric data and game data may be received from one or more controller devices during the gameplay of the game. Once the game is completed, a biometric summary may be displayed based on the biometric data at a home screen or the health and wellness hub screen 300 upon completion of the game.

The hub server 170 may also cause to display one or more social options 312 at the health and wellness hub 300, wherein users can compete with friends for certain game options that allow competition using biometric data.

The hub server 170 may further allow an option for viewing periodic biometric data in a customized report, such as via messages or email or as a banner, based on a user's inputted periodicity (e.g., once a week seeing timed sessions with how many miles and calories the user burned playing a particular game on their exercise bike). The periodic biometric data may further be compared to past days, weeks, or other types of games played by the user or other activities the user partook.

The hub server 170 may receive biometric data through one or more APIs from the exercise equipment that is used for the calculations associated with the customized report and biometric data used for displaying summaries at the health and wellness hub 300.

Figure 4:
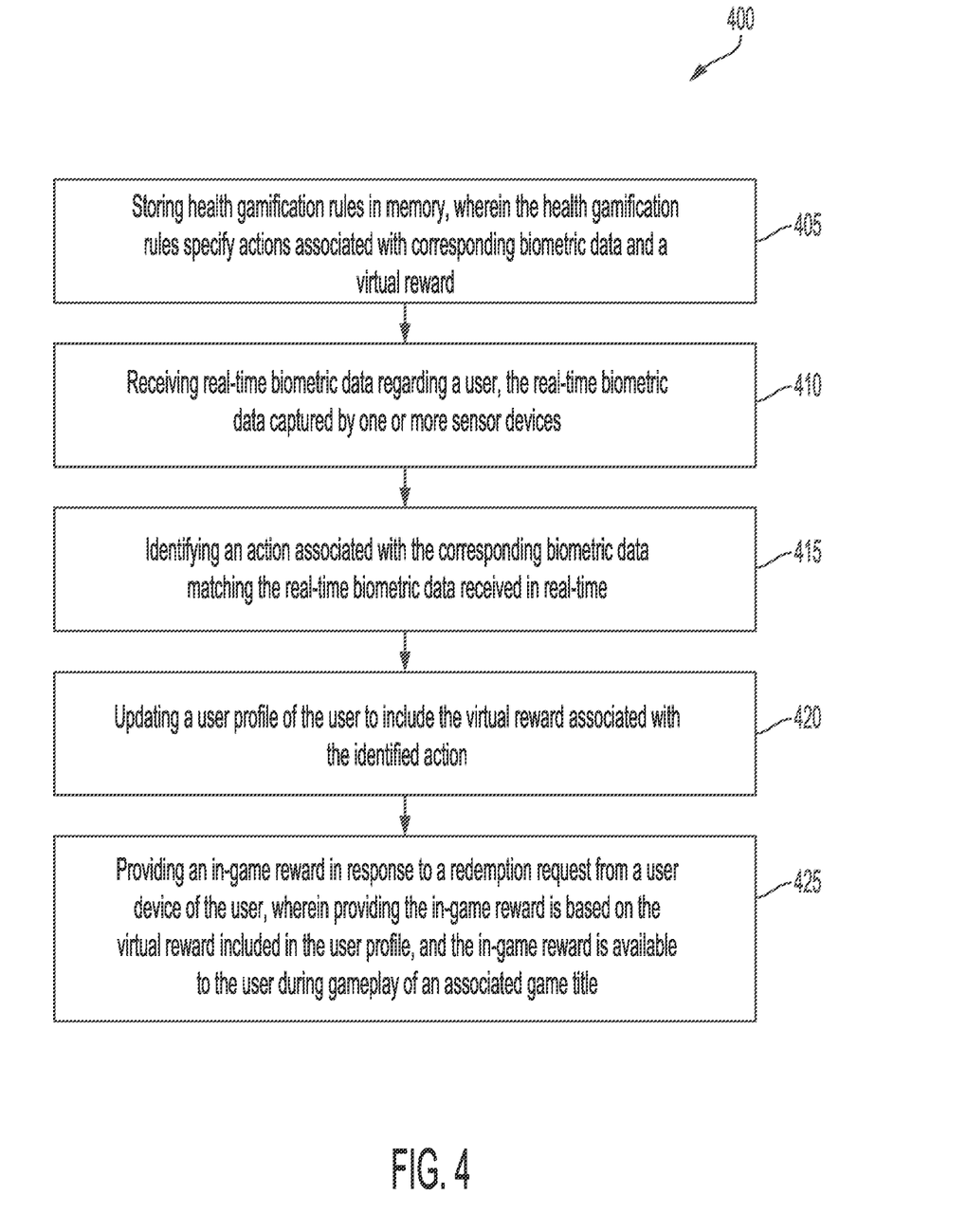
FIG. 4 is a flowchart of an exemplary method for integrating biometric data into gameplay of interactive content titles.

FIG. 4 is a flowchart of an exemplary method 400 for integrating biometric data into gameplay of interactive content titles. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes storing health gamification rules in memory at block 405. For example, the databases 140 illustrated in FIG. 1 may store the health gamification rules in memory. In some examples, the health gamification rules specify actions associated with corresponding biometric data and a virtual reward, the virtual reward redeemable towards one or more in-game rewards associated with one or more interactive content titles.

According to some examples, the method includes receiving real-time biometric data regarding a user, the real-time biometric data captured by one or more sensor devices at block 410. For example, the hub server 170 illustrated in FIG. 1 may receive real-time biometric data regarding a user, the real-time biometric data captured by one or more sensor devices.

According to some examples, the method includes identifying an action associated with the corresponding biometric data matching the real-time biometric data received in real-time at block 415. For example, the hub server 170 illustrated in FIG. 1 may identify an action associated with the corresponding biometric data matching the real-time biometric data received in real-time.

According to some examples, the method includes updating a user profile of the user to include the virtual reward associated with the identified action at block 420. For example, the hub server 170 or platform servers 120 illustrated in FIG. 1 may update a user profile of the user to include the virtual reward associated with the identified action.

According to some examples, the method includes providing an in-game reward in response to a redemption request from a user device of the user at block 425. For example, the hub server 170 or platform servers 120 illustrated in FIG. 1 may provide an in-game reward in response to a redemption request from a user device of the user. In some examples, providing the in-game reward is based on the virtual reward included in the user profile, and the in-game reward is available to the user during gameplay of an associated game title.

According to some examples, the method includes causing to display, at the user device, a hub screen displaying one or more game options at block 430. For example, the user devices 130 and/or the platform servers 120 illustrated in FIG. 1 may cause to display, at the user device, a hub screen displaying one or more game options. In some examples, each game option initiates a game with biometric data as an input for gameplay.

According to some examples, the method includes during gameplay of the game, receiving game data from one or more controller devices during the gameplay of the game, wherein each of the one or more sensor devices include one or more biometric sensors or receives sensory data that is convertible into biometric data at block 435. For example, the interactive content source servers 110 and/or the platform servers 120 illustrated in FIG. 1 may receive game data from one or more controller devices during the gameplay of the game. In some examples, each of the one or more sensor devices include one or more biometric sensors or receives sensory data that is convertible into biometric data.

According to some examples, the method includes causing to display a biometric summary based on the biometric data at the hub screen upon completion of the game at block 445. For example, the hub server 170, the platform servers 120, and/or the user devices 130 illustrated in FIG. 1 may cause to display a biometric summary based on the biometric data at the hub screen upon completion of the game.

According to some examples, the method includes causing to display an overall summary of wellness progress based biometric summaries including the biometric summary at block 450. For example, the hub server 170, the platform servers 120, and/or the user devices 130 illustrated in FIG. 1 may cause to display an overall summary of wellness progress based on the biometric summaries including the biometric summary.

According to some examples, the method includes integrating with an application on a mobile device at block 455. For example, the user devices 130 and the hub server 170 illustrated in FIG. 1 may integrate with an application on a mobile device. In some examples, biometric data captured by the application further adjusts the overall summary of the wellness progress.

According to some examples, the method includes providing a setting for adjusting a fitness goal that changes one or more characteristics of a character in the game at block 460. For example, the setting may change a physical look of the character, or changing their abilities in the game that require biometric data input to offset or add to their abilities in the game For example, the hub server 170, the interactive content source servers 110 and/or the platform servers 120 illustrated in FIG. 1 may provide a setting for adjust a fitness goal that changes one or more characteristics of a character in the game.

According to some examples, adjusting

According to some examples, the method includes adjusting game requirements to require certain inputs based on the corresponding biometric data at block 465. For example, the hub server 170, the interactive content source servers 110 and/or the platform servers 120 illustrated in FIG. 1 may adjust game requirements to require certain inputs based on the corresponding biometric data.

According to some examples, the method includes adjusting gameplay movements based on the real-time biometric data at block 470. For example, the interactive content source servers 110 and/or the platform servers 120 illustrated in FIG. 1 may adjust gameplay movements based on the real-time biometric data. In some examples, the movement can be movement captured by a motion capture device and the captured movement is analyzed and converted into biometric data. In some examples, a gameplay movement of a character in a game is dependent on movement by a user playing the game. In some examples, the movement is calculated based on the real-time biometric data. In some examples, the real-time biometric data is a heartrate of a user playing the game or estimated calories burned during the gameplay.

Figure 5:
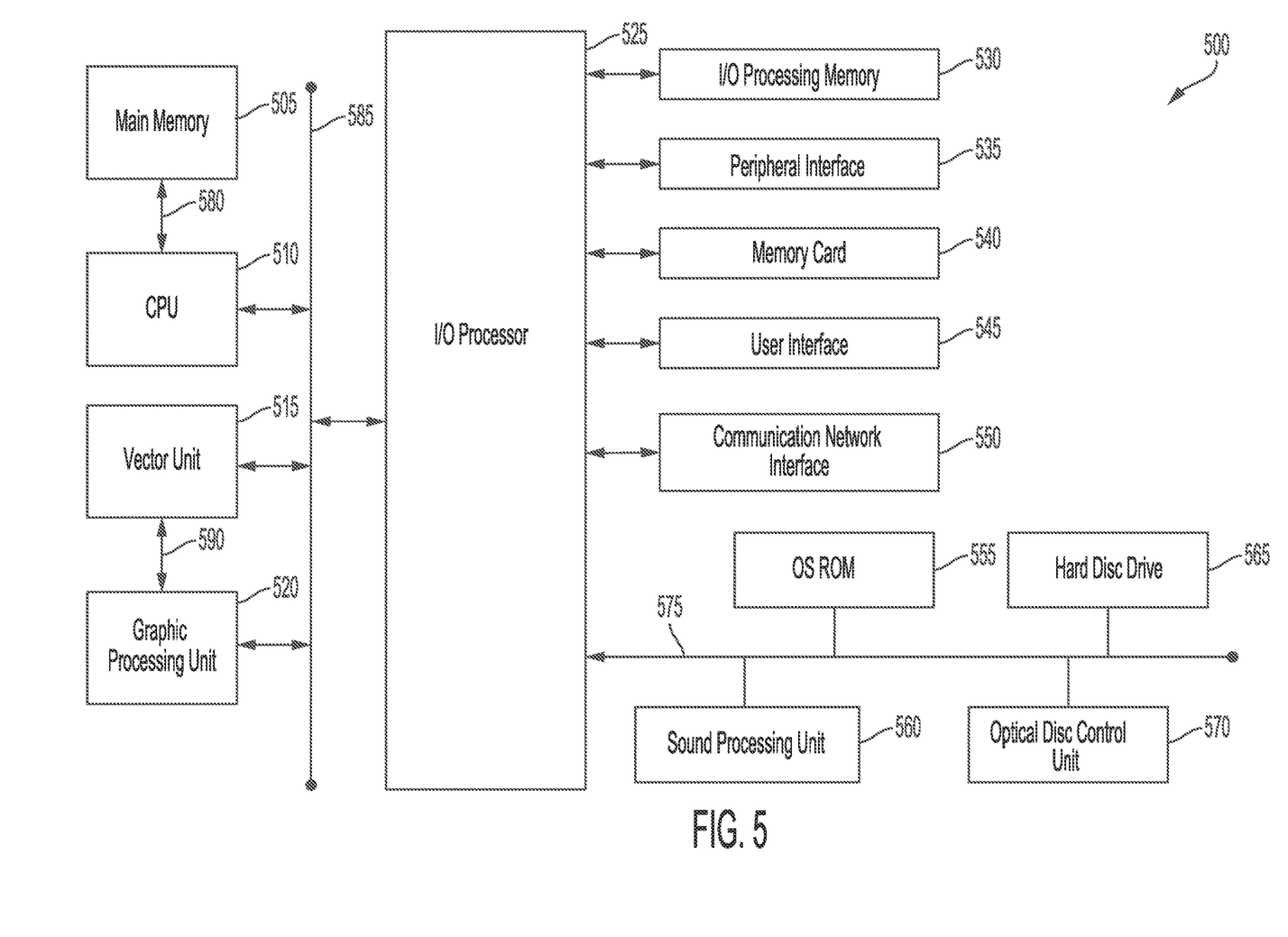
FIG. 5 illustrates an exemplary electronic entertainment system that may be used to integrate biometric data into gameplay of interactive content titles.

FIG. 5 illustrates an exemplary electronic entertainment system that may be used to integrate biometric data into gameplay of interactive content titles. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A method for integrating biometric data into gameplay of interactive content titles, the method comprising:
   storing health gamification rules in memory, wherein the health gamification rules specify different actions associated with one or more corresponding biometric data targets;
   generating a display of one or more game options for implementing health gamification rules corresponding to use of biometric data as one or more inputs for gameplay, wherein each game option initiates a different set of one or more health gamification rules;
   launching an interactive content title based on a selection of one of the game options that corresponds to a selected game activity associated with the interactive content title;
   receiving real-time biometric data regarding a user, the real-time biometric data captured by one or more sensor devices, wherein the real-time biometric data includes sensor measurements of the biometric data as captured by the sensor devices in real-time during the selected game activity;
   identifying an action associated with the corresponding biometric data matching the real-time biometric data received in real-time in accordance with the health gamification rules associated with the selected game option; and
   updating a user profile of the user based on the identified action.

2. The method of claim 1, further comprising generating a display of a biometric summary window based on the received real-time biometric data.

3. The method of claim 2, wherein at least a portion of the real-time biometric data is received from a mobile device associated with the user, and wherein the display of the biometric summary indicates the real-time biometric data received from the mobile device.

4. The method of claim 1, wherein one of the health gamification rules further specifies an adjustment to one or more characteristics of a character in the game, the adjustment associated with the specified action, and wherein the real-time biometric data is captured during gameplay using the adjusted character.

5. The method of claim 1, wherein one of the health gamification rules further specifies an adjustment to one or more game requirements regarding user inputs based on the corresponding biometric data, and wherein the real-time biometric data is captured during gameplay using the adjusted game requirements.

6. The method of claim 5, wherein the game requirements correspond to a control setting of health or exercise equipment, and wherein adjusting the game requirements includes adjusting the control setting of the health or exercise equipment.

7. The method of claim 1, wherein one of the health gamification rules further specifies an adjustment to one or more gameplay movements based on the real-time biometric data, and wherein further real-time biometric data is captured during gameplay using the adjusted gameplay movements.

8. The method of claim 7, wherein a gameplay movement of a character in a game is dependent on a real-world user movement, wherein the user movement is identified based on the real-time biometric data.

9. The method of claim 8, wherein the user movement is captured by a motion capture device, and further comprising converting the captured movement into the real-time biometric data.

10. The method of claim 1, wherein one of the health gamification rules further specifies a self-reported task associated with a virtual reward, and further comprising receiving user input confirming completion of the self-reported task.

11. A system for integrating biometric data into gameplay of interactive content titles, the system comprising:
  memory that stores health gamification rules, wherein the health gamification rules specify different actions associated with one or more corresponding biometric data targets;
  a communication interface that receives real-time biometric data regarding a user, the real-time biometric data captured by one or more sensor devices, wherein the real-time biometric data includes sensor measurements of the biometric data as captured by the sensor devices in real-time during a selected game activity; and
  one or more processors configured to execute instructions, wherein the processors execute the instructions to:
    generate a display of one or more game options for implementing health gamification rules corresponding to use of biometric data as one or more inputs for gameplay, wherein each game option initiates a different set of one or more health gamification rules;
    launch an interactive content title based on a selection of one of the game options that corresponds to the selected game activity associated with the interactive content title;
    identify an action associated with the corresponding biometric data matching the real-time biometric data received in real-time in accordance with the health gamification rules associated with the selected game option; and
    update a user profile of the user based on the identified action.

12. The system of claim 11, wherein one of the health gamification rules further specifies an adjustment to one or more characteristics of a character in the game, the adjustment associated with the specified action, and wherein the real-time biometric data is captured during gameplay using the adjusted character.

13. The system of claim 11, wherein one of the health gamification rules further specifies an adjustment to one or more game requirements regarding user inputs based on the corresponding biometric data, and wherein the real-time biometric data is captured during gameplay using the adjusted game requirements.

14. The system of claim 13, wherein the game requirements correspond to a control setting of health or exercise equipment, and wherein the processor adjusts the game requirements by further adjusting the control setting of the health or exercise equipment.

15. The system of claim 11, wherein one of the health gamification rules further specifies an adjustment to one or more gameplay movements based on the real-time biometric data, and wherein further real-time biometric data is captured during gameplay using the adjusted gameplay movements.

16. A non-transitory computer readable storage medium comprising instructions stored thereon, the instructions executable by a computing system to perform a method for integrating biometric data into gameplay of interactive content titles, the method comprising:
  storing health gamification rules in memory, wherein the health gamification rules specify different actions associated with one or more corresponding biometric data targets;
  generating a display of one or more game options for implementing health gamification rules corresponding to use of biometric data as one or more inputs for gameplay, wherein each game option initiates a different set of one or more health gamification rules;
  launching an interactive content title based on a selection of one of the game options that corresponds to a selected game activity associated with the interactive content title;
  receiving real-time biometric data regarding a user, the real-time biometric data captured by one or more sensor devices, wherein the real-time biometric data includes sensor measurements of the biometric data as captured by the sensor devices in real-time during the selected game activity;
  identifying an action associated with the corresponding biometric data matching the real-time biometric data received in real-time in accordance with the health gamification rules associated with the selected game option; and
  updating a user profile of the user based on the identified action.

17. The non-transitory computer readable medium of claim 16, wherein one of the health gamification rules further specifies an adjustment to one or more characteristics of a character in the game, the adjustment associated with the specified action, and wherein the real-time biometric data is captured during gameplay using the adjusted character.

18. The non-transitory computer readable medium of claim 16, wherein one of the health gamification rules further specifies an adjustment to one or more game requirements regarding user inputs based on the corresponding biometric data, and wherein the real-time biometric data is captured during gameplay using the adjusted game requirements.

19. The non-transitory computer readable medium of claim 18, wherein the game requirements correspond to a control setting of health or exercise equipment, and wherein the computing system adjusts the game requirements by further adjusting the control setting of the health or exercise equipment.

20. The non-transitory computer readable medium of claim 16, wherein one of the health gamification rules further specifies an adjustment to one or more gameplay movements based on the real-time biometric data, and wherein further real-time biometric data is captured during gameplay using the adjusted gameplay movements.

* * * * *